J. W. BRYCE.
COST KEEPING MACHINE.
APPLICATION FILED JAN. 22, 1919.

1,340,435.

Patented May 18, 1920.
7 SHEETS—SHEET 1.

Fig. 1.

Inventor
James W. Bryce
By his Attorneys
Kerr, Page, Cooper & Hayward

J. W. BRYCE.
COST KEEPING MACHINE.
APPLICATION FILED JAN. 22, 1919.

1,340,435.

Patented May 18, 1920.

Inventor
James W. Bryce
By his Attorneys
Kerr, Page, Cooper & Hayward

J. W. BRYCE.
COST KEEPING MACHINE.
APPLICATION FILED JAN. 22, 1919.

1,340,435.

Patented May 18, 1920.
7 SHEETS—SHEET 3.

Inventor
James W. Bryce
By his Attorneys
Kerr, Page, Cooper & Hayward

J. W. BRYCE.
COST KEEPING MACHINE.
APPLICATION FILED JAN. 22, 1919.

1,340,435. Patented May 18, 1920.
7 SHEETS—SHEET 4.

Inventor
James W. Bryce
By his Attorneys
Kerr, Page, Cooper & Hayward

J. W. BRYCE.
COST KEEPING MACHINE.
APPLICATION FILED JAN. 22, 1919.

1,340,435.

Patented May 18, 1920.
7 SHEETS—SHEET 5.

Inventor
James W. Bryce
By his Attorneys
Kerr, Page, Cooper & Hayward

J. W. BRYCE.
COST KEEPING MACHINE.
APPLICATION FILED JAN. 22, 1919.

1,340,435.

Patented May 18, 1920.
7 SHEETS—SHEET 6.

Inventor
James W. Bryce
By his Attorneys
Kerr, Page, Cooper & Hayward

J. W. BRYCE.
COST KEEPING MACHINE.
APPLICATION FILED JAN. 22, 1919.

1,340,435.

Patented May 18, 1920.
7 SHEETS—SHEET 7.

Inventor
James W. Bryce
By his Attorneys
Kerr, Page, Cooper & Hayward

UNITED STATES PATENT OFFICE.

JAMES W. BRYCE, OF BINGHAMTON, NEW YORK, ASSIGNOR TO THE INTERNATIONAL TIME RECORDING COMPANY OF NEW YORK, A CORPORATION OF NEW YORK.

COST-KEEPING MACHINE.

1,340,435.

Specification of Letters Patent.

Patented May 18, 1920.

Application filed January 22, 1919. Serial No. 272,447.

*To all whom it may concern:*

Be it known that I, JAMES W. BRYCE, a citizen of the United States, residing at Binghamton, in the county of Broome and State of New York, have invented certain new and useful Improvements in Cost-Keeping Machines, of which the following is a full, clear, and exact description.

If in an industrial establishment a certain number of employees are hired at so much per day or week the matter of computing their wages is manifestly a simple one. Should a number of the operatives, however, be paid a certain stipulated amount per hour, and are to receive pay for only such time as they actually work, it may be very desirable to compute the elapsed time during which they were employed on a given job, the aggregate of the pay due them for such time and other items, as, for example, the cost of the product of the work which would indicate the amount of wages plus overtime, the estimated overhead cost and the like.

Any known machine which will compute and record such widely varying items as these are likely to be would be prohibitively complicated and expensive, and hence one of the most desirable and convenient sources of ready and accurate information in industrial enterprises of this nature is lacking, and the ordinary methods of book-keeping and computation, with all their attendant possibilities of error, must be resorted to to furnish the data needed.

Recognizing this condition, I have sought to produce an extremely simple, inexpensive and practicable recorder and counter that may be capable of general and widely varying use for computing variable factors, which are functions of time, and recording any of the items of information above enumerated, and this I have succeeded in doing by the design and construction of a counter having the following general characteristics:

I employ in conjunction with a clock generally a synchronized secondary, a value impulse timer, comprising a certain number, preferably nine, of such means as cam disks with high points varying in number from one to nine, that may be rotated at a given rate by the clock and caused to close electrical circuits, to a number of lines there being one line for each digit number. The number of impulses sent over each line corresponds to the digit value of the rate components irrespective of the position value thereof. Selective connectors are adapted to connect the lines to magnets which correspond to the position value of the digits of the rate, and these magnets through special devices reduce the impulses to the proper amount in accordance with the time ratio of the value impulse timer. These magnets operate by special devices hereinafter to be described a train of register or type wheels, from which impressions may be taken at any desired times. Such a device answers for all cases where numerals containing not more than three digits are involved in the computations which are to be made.

For example, to compute the amount due a workman for any given period at a certain rate, say thirty-seven and one-half cents per hour, the three magnets which may be assumed to record hundredths and tenths of a cent and whole cents are selectively plugged, in accordance with the position value of the magnets, into those cams which, by the number of impulses which they send, will collectively operate the register wheels so as to show the exact figure or the nearest possible approximation thereto which corresponds at the rate assumed to the time elapsed.

For convenience the cams are rotated once every six minutes or ten times each hour, and hence the cam with three points will send thirty impulses per hour, that with seven points will send seventy and that with five points will send fifty impulses. Hence, if the first-named cam is plugged in to the units magnet, the second to the tenths magnet and the third to the hundredths magnet, in one hour the three cams will send collectively to the recorder 30+70+50 impulses to the several magnets respectively with the result that the units wheel will be moved 30+7+½ times, or in other words indicate at the end of an hour 37½, and at least an approximately correct amount for any fraction of an hour.

Under the assumption made, it will therefore be seen that what may be termed the value cams are capable of sending to any of the three magnets from one to nine impulses every six minutes or from ten to ninety impulses every hour, according to the electrical connections that may be established, and furthermore, that with the device adapted for use with three digits not only may rates be obtained from one-tenth of a cent per hour to ninety-nine and nine-tenths cents per hour, but that as many multipliers as may be needed may be used so that hundredths of a cent per hour or hundreds of cents per hour may also be used if so desired.

Usually, in addition to the counter mechanism, the clock operates a time recording mechanism, from which records showing elapsed time may be taken at the same time as the other values, and it will more fully appear from the description which follows how either one, or several, of these counters or recorders may be used for many purposes and in many ways. From the above general description, however, it is manifest that a single and exceedingly simple and inexpensive instrument of the nature proposed is capable of a very wide range of use and operation, and of performing operations and computations which heretofore would have involved the most impracticable complications.

This improvement is illustrated in the accompanying drawings in which.

Similar reference numerals in the several figures designate corresponding parts.

Figure 1:
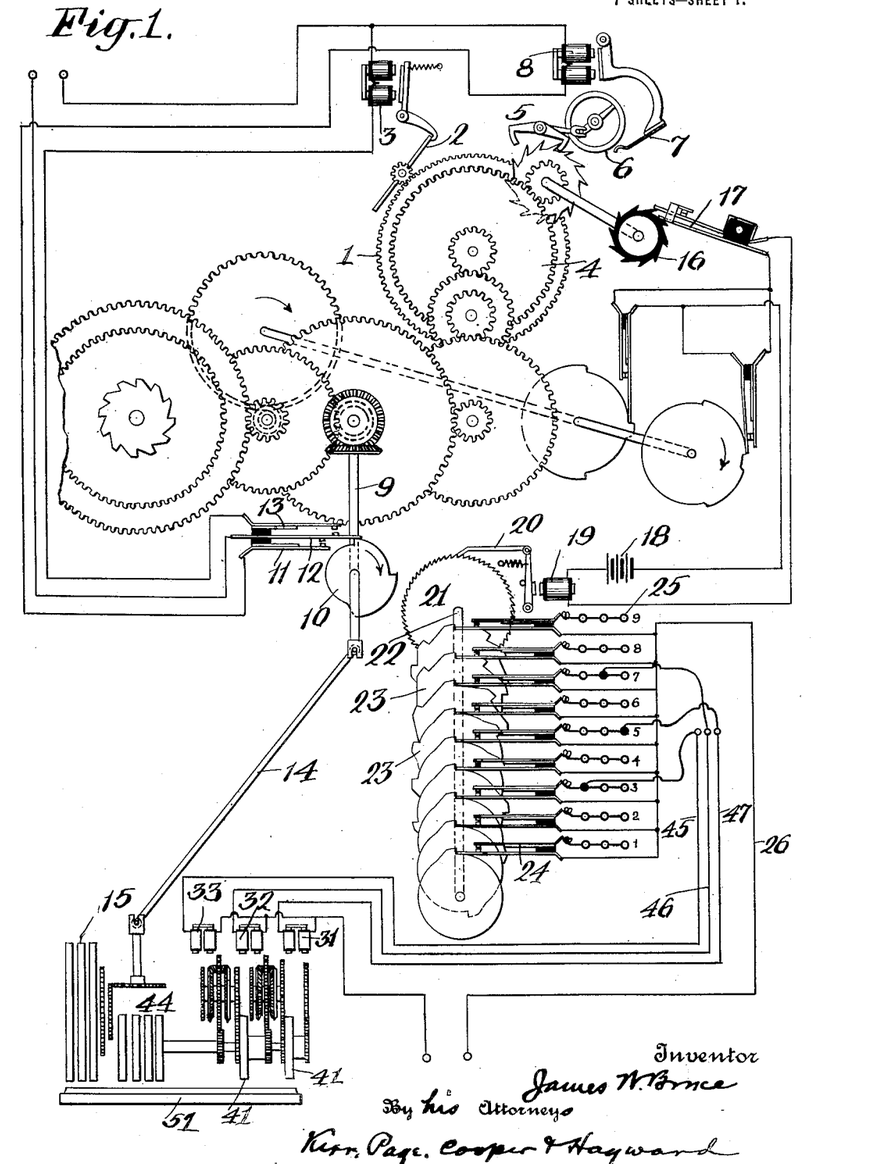
Figure 1 is a view, largely diagrammatic, of a synchronized secondary clock driving a recorder and a counter which is adapted to set the type wheels of said recorder.
Figure 2:
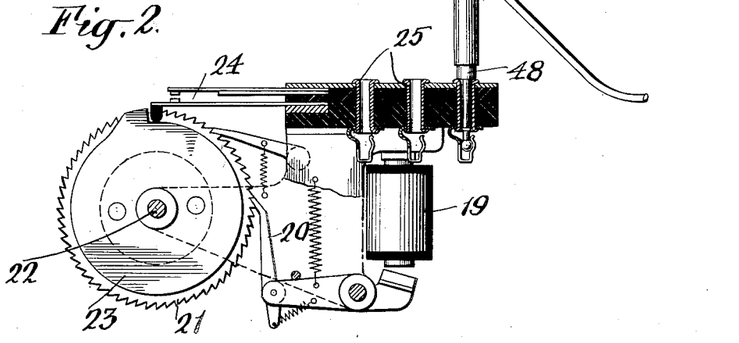
Fig. 2 is an enlarged sectional view of the details of the mechanism of the counter proper.
Figure 3:
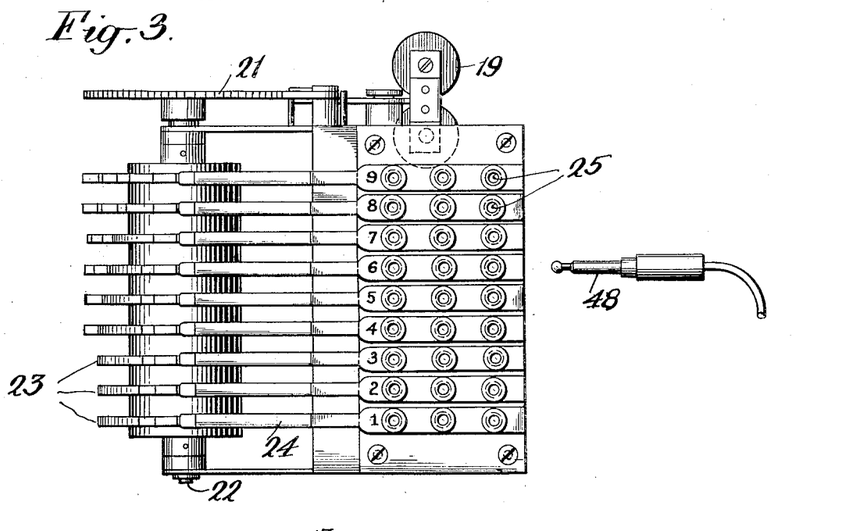
Fig. 3 is a top plan view of the same.

Referring to Fig. 1, a synchronized clock is shown which, being new in the art, requires a brief explanation, though a more complete description of the device is contained in a copending application filed by me on May 21st, 1918, Serial No. 235,813. To the clock train is geared a differential, one member 1 of which is normally locked by a fan 2 engaging therewith, which latter is prevented from rotation by the armature of an electromagnet 3, while the other member 4 engages with an escapement 5 and balance wheel 6, the operation of which determines the normal movement of the clock hands. The balance wheel 6 is adapted to be stopped by a brake 7 operated by the armature of an electromagnet 8.

Figure 4:
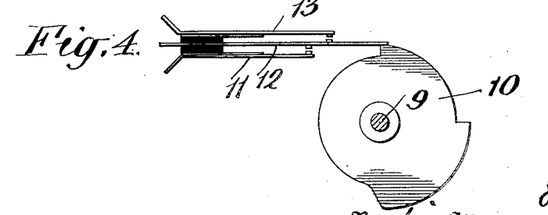
Fig. 4 is an enlarged detail of a cam forming part of the secondary clock mechanism.

On the hour shaft 9 of the clock is a three-pointed cam 10 controlling three contact springs 11, 12 and 13, and these parts are so arranged that at the exact hour, as indicated by the hands of the secondary clock, the contact 12 is dropped onto contact 11 for a given interval and at exactly thirty minutes of the hour, as indicated by the secondary, the contact 12 is raised into engagement with contact 13 and kept in such engagement for just fifteen minutes. The details of this cam mechanism are shown in Fig. 4.

The master clock operates to send to line a current for fifteen minutes during each hour, the flow beginning at fifteen minutes of the hour, true time, and ceasing at the even hour. If the secondary clock be on time, therefore, the periods of closure to the main line which it effects through the action of cam 10 will have no effect, but if it be too fast the magnet 8 will be energized by the overlapping of the period first described with the current period of the master clock, and hence the secondary will be stopped until the master clock catches up with it. So also if the secondary be too slow, the magnet 3 will be energized and the fan 2 released, which will permit the secondary to run faster until it has caught up with the master clock.

The secondary clock, through any suitable and preferably mechanical connection such as the spindle 14, drives the time dials 15 of a time recorder which are provided with type to indicate days and time of day and may be constructed and arranged in any well known way.

The secondary is also provided with a ten toothed ratchet 16 on the verge shaft that operates contacts 17 closing the circuit of a source of current 18 containing an electromagnet 19. This circuit is responsive to the closure of contacts 17 during working hours only, this result being secured by the usual contacts and cams employed for such purposes in machines of this class.

Figure 5:
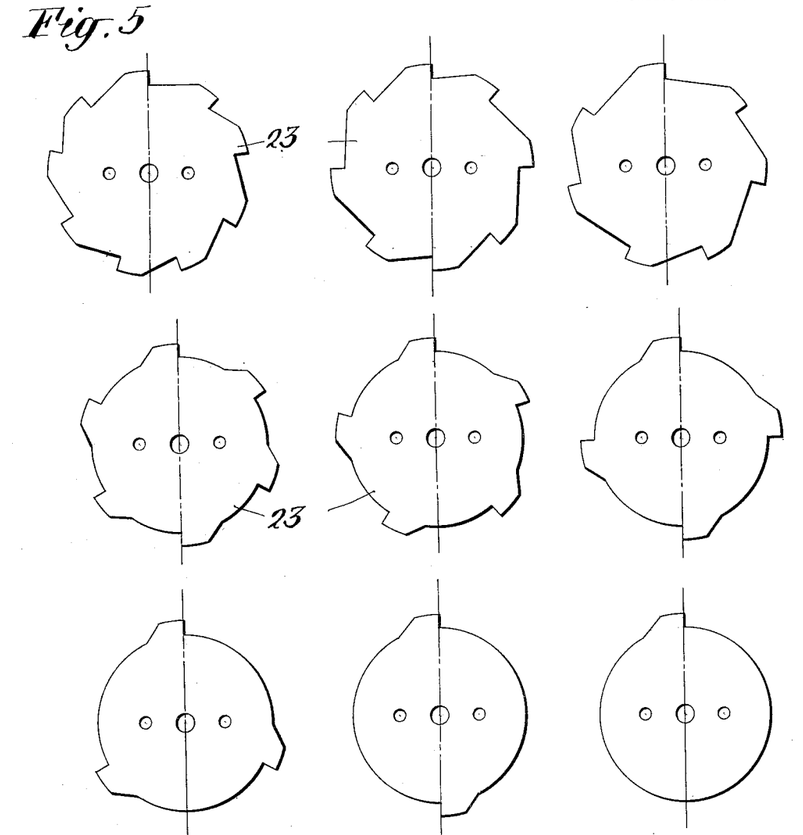
Fig. 5 is a detail of the factor cams of the counter in this case nine in number.

The electromagnet 19 operates through its armature a pawl 20 that engages with and rotates step by step a ratchet wheel 21 and thereby imparts to a shaft 22 rotation at the rate of one complete revolution every six minutes. The shaft 22 carries nine cam disks 23 which have high points or teeth varying in number from one to nine, see Fig. 5, and bearing upon the peripheries of these cams are spring contacts 24 which by means of the teeth are brought into temporary engagement. To one of each pair of contacts 24 a line or bus bar is connected to which three plug sockets 25 are connected while the other contact is connected to the common return wire 26 of a suitable source of current. The three plug sockets 25 form a convenient means for determining the selection of the plugs in accordance with the position value of the digits as will be hereafter explained.

Figure 9:
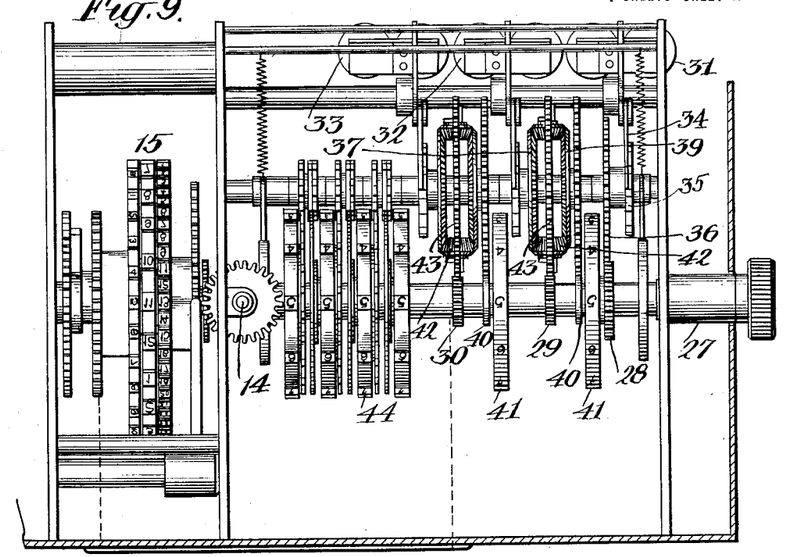
Fig. 9 is a top plan view of the recording mechanism and portions of the counter.
Figure 10:
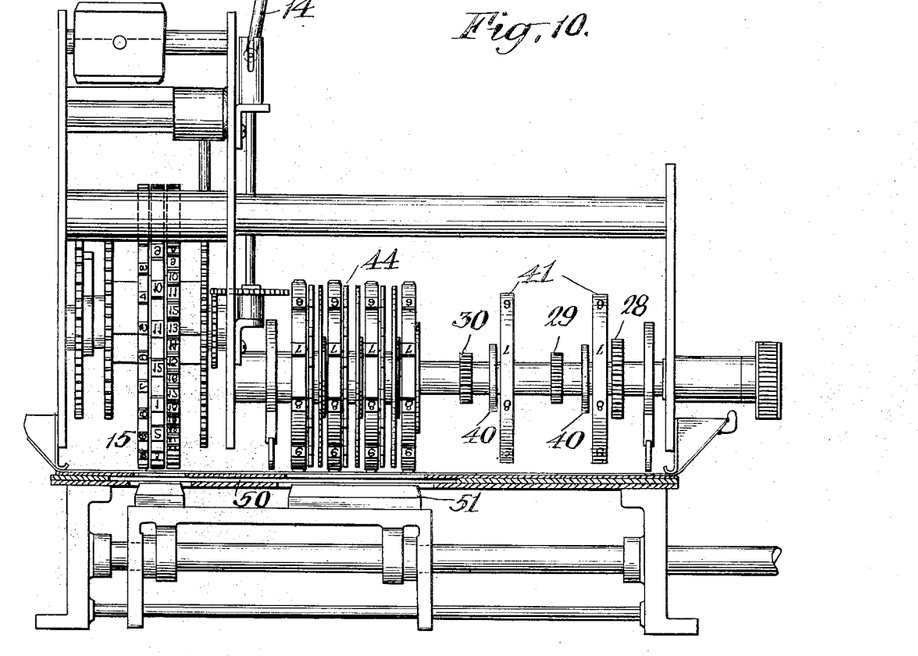
Fig. 10 is a view inside elevation of the same parts.

The counter proper, shown in Figs. 9 and 10, comprises a shaft 27 carrying gear wheels 28, 29 and 30 on independently rotatable sections of sleeve, and three electromagnets 31, 32 and 33 whose function it is to rotate such sleeve sections. For this purpose the magnet 31 operates a pawl 34 which turns step by step a ratchet wheel 35 which in turn imparts rotation to a large wheel 36 which engages with the gear wheel 28. The ratio of the gearing is such that the movement of the last element is in accordance with the time ratio of the value impulse timer. As shaft 22 rotates 10 times an hour the reduction would be ten to one.

Figure 17:
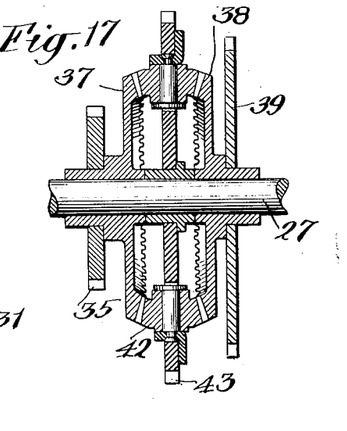
Fig. 17 is a detail of a differential gear used in the counter.

The magnets 32 and 33 have similar pawls which rotate ratchet wheels 35 that impart rotation to gears 37 forming one side of two differential gears, the opposite members of which 38 are fixed to sleeve sections carrying gear wheels 39, as shown in Fig. 17. The gears 39 receive movements from disks 40 with one engaging tooth fixed to the preceding sleeve section on shaft 27, or to a numeral disk 41 mounted on such section.

The two side gears 37 and 38 of the differentials engage with bevel pinions 42 carried by central gear wheels 43 which latter engage with the gears 29 and 30 respectively on shaft 27. If either gear 37 or 38 be rotated the bevel gears will also be turned and will impart rotary motion to the central gears 43. If both gears 37 and 38 be turned this movement of rotation of gears 43 will be doubled.

The magnet 31 and connector 47 correspond to the tenths value position and the magnet 31 is adapted to set up the digit value of the rate corresponding to the tenths value position upon the tenths register wheel. The magnet 32 and connector 46 correspond with the units value position and the magnet 32 is adapted to set up the digit value of the rate corresponding to the units value position upon the units register wheel. The magnet 33 and connector 45 correspond to the tens value position and the magnet 33 is adapted to set up the digit value of the rate corresponding to the tens value position upon the tens register wheel.

On the shaft 27 are also mounted a series of recording disks 44 with raised digit type, the first disk to the right being rotated through the gear 30 by the left hand differential, and the others by any suitable transfer mechanism which will effect the proper registering of figures.

With certain observations which I shall make in passing as to the specific character of some of the parts not described in detail above, the operation of the mechanism as a whole may now be most readily comprehended from a detailed explanation of what occurs in some particular instance of use. Let it be assumed, therefore, that it is desired to compute and record the time of beginning and ending of a certain piece of work and the amount due the workman for the time he has spent on the job, his pay being at the rate of 37½ cts. an hour.

The magnets 31, 32 and 33 are included in branches 45, 46 and 47 of a circuit for which wire 26 is the common return, and any one of these magnets may be connected to the contacts 24 of disks 23 by inserting a plug 48 connected with its branch into one of the holes 25. As the shaft 22 rotates once every six inches, any number of impulses of current from 1 to 9 inclusive may be sent through any of the three magnets during that period or as six minutes is one tenth of an hour, from 10 to 90 impulses per hour may be sent through any of the counter magnets according to the positions of the several plugs.

If now we should be called upon to record values at the rate of 37 cents per hour, we should insert the plug 48 connected with magnet 33 into the first hole connected to the contacts of the disk with three teeth as this will send thirty impulses per hour through magnet 33 and thus move the units wheel of the recorder that number of type spaces. The plug from magnet 32 would be inserted into the second hole from the disk with seven teeth as this will send seventy impulses per hour to magnet 32 or add seventy tenths or seven units to the computation, and the plug from magnet 31 would be inserted in the third hole from the disk with five teeth which will add fifty impulses to magnet 31 per hour and thus add fifty one-hundredths or one half of a unit to the computation.

In the foregoing paragraph reference has been made to the insertion of the plug connected with magnet 33 in the first hole, the plug from magnet 32 in the second hole and the plug from magnet 31 in the third hole. It is obvious that as far as all the electrical effects are concerned the plugs might all be inserted in the first, second or third series of holes. The method outlined is preferable in that it permits the workmen to visualize the value position of the digits. It might even be desirable to label the three plugs and connectors as follows: 45 tens value, 46 units value, and 47 tenths value position. The rows of holes would be similarly numbered and the workman could see at a glance that he had properly placed his plugs, thereby avoiding a setting of 17 when 71 was intended, or vice versa.

If the recorder be in the zero position at the start, at the end of hour it would indicate thirty-seven and a half and a correspondingly increased amount at any given moment thereafter. Similarly any other combination of rates involving three digits may be adopted and as has been stated with three digits, as shown, rates may be computed from one tenth of a cent per hour to ninety-nine and nine-tenths cents per hour.

The uses of the instrument are not limited to such a case as has been assumed. For example, the device may be used to compute elapsed time by connecting the plug of magnet 33 with the contacts of the cam disk having six teeth, which would send sixty impulses, corresponding to sixty minutes to the units magnet per hour.

Figure 19:
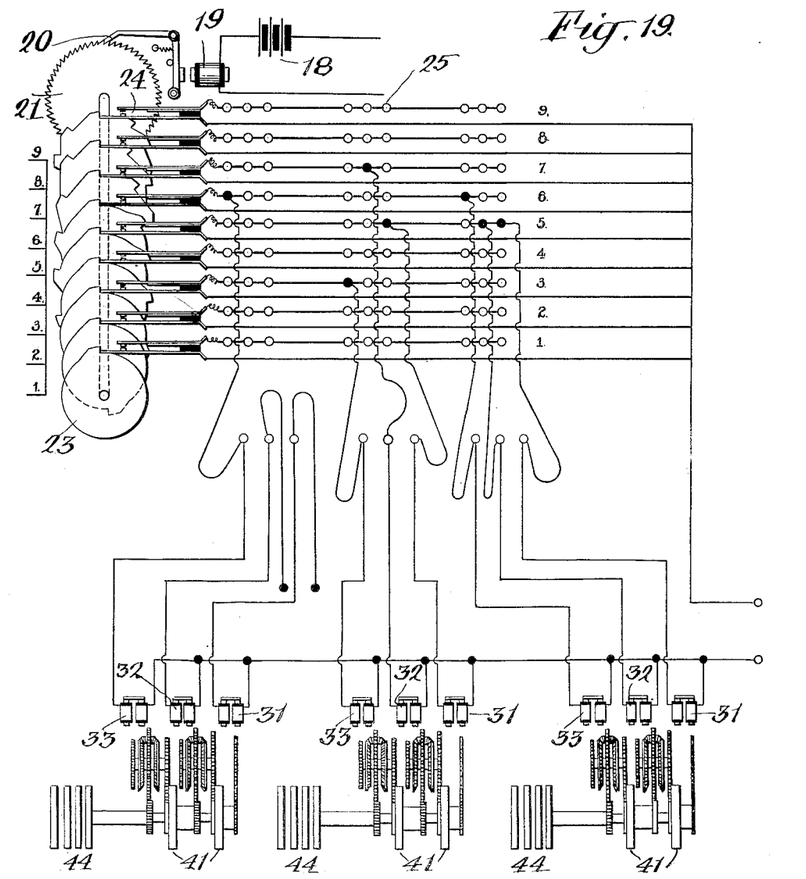
Fig. 19 is a view, mainly diagrammatic, of the several counters, their operating mechanisms, and the necessary electrical connections therefor.

Again, the proportionate overhead or overtime charges being known, these may be computed, if so desired. Consequently for practical use two or three sets of mechanisms may be used conjointly without duplication of all the parts, as is shown in Fig. 19, which will be readily understood without further description than to say that the left hand instrument is used to record elapsed time, the middle instrument the wages at a given rate, and that at the right overhead charges or the like.

I may now direct attention to certain more or less striking features of this invention. There is a plurality of magnets which correspond to the various factor disks and which might in all probability be called upon to contribute to the movement of the recording wheels at the same instant. This, however, is entirely possible with the construction which I have devised. The magnet 31, for example, may effect the complete rotation of the first wheel or disk which should, therefore, move the next disk one step, at the same instant that the magnet 32 moves the said next disk. This is made possible by the use of the differentials, for while the right hand gear 38 of the differentials may be moved by the transfer device and gear 39, the other side gear 87 is free to be moved by the ratchet 36, and the movements of both gears are imparted in the same direction to the contact gear 43, the total movement of which is proportional to the aggregate of the two.

It will be understood that the proportions of the gears used for transmitting movement from one element to another are important, but this is a matter which would readily be understood by those skilled in the art.

The proportions and relations of this machine shown and described are arbitrary, but have been selected from considerations of the greatest convenience. For example, the design of the machine is based upon the tenth of a minute unit, and the rate of movement of the value cams being one revolution in six minutes, there will be sixty units on the periphery of the cams in this period, as illustrated by a further assumed case. Suppose a workman rings in at 9 h. 12 m. and out at 11 h. 07 m. This gives an elapsed time of 1 h. 55 m. during which 115 impulses have been sent by the cams. As the design is for a tenth of a minute as the unit, this means that 1150 units will be covered by this period, or at the rate of 60 units per half minute, it shows that the cams have made 19⅙ revolutions.

If we assume that the rate wage to be computed is thirty-seven and one-half cents per hour, and one plug is inserted so as to take impulses from the cam with three high parts, that cam will send 19×3=57 impulses, which will add to the counter or register wheels $.57. The extra sixth of a revolution, of course, as it does not quite reach another contact, sends nothing, so that there is a small value or fraction of a cent lost. The second plug connected to the cam with seven high parts will send 19×7=133+1 or 134 impulses. In this case the extra sixth of a revolution being more than one seventh of the revolution of the cam, the extra impulse will be added in and by reason of the operation by the second magnet 32 of the counter will add $.134 to the total.

The third plug connected to the cam with five high parts will send 19×5=95+1 or 96 impulses to magnet 31, which will add $.0096 to the total, so that the accumulation of all the impulses will result in a total of $.7136, which will be exhibited by the disks of the counter. This is an amount slightly different from that obtained by multiplying $.375 by 1 h. 55 m. due to the fact that certain fractional impulses are lost. But the amount so lost does not equal a commercially measured amount, being no more than a small fraction of one cent. By the ordinary process of multiplication the true amount would be $.718, whereas the counter shows only $.7136.

So therefore, while there may be times when the counter will show the exact and required amount, at other times it may be off by some small fraction, but when it is considered that one cent is the smallest value that can be figured, and that time is computed down to periods of one minute, we shall always be within one half of one cent plus or minus, and well within the commercial limit of accuracy required.

Figure 6:
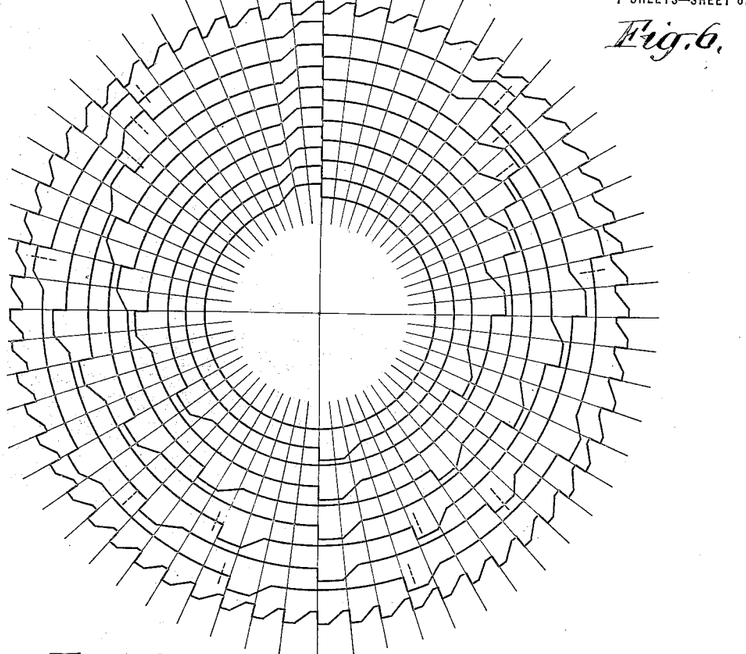
Fig. 6 is a theoretical diagram for showing the relations of the said cams.

In Fig. 6 a diagrammatic illustration of the relations of the cams throughout one revolution of the shaft is given, short dotted lines being drawn to show where, if the teeth were multiples of sixty, they should be, their actual position being shown in full lines.

Figure 11:
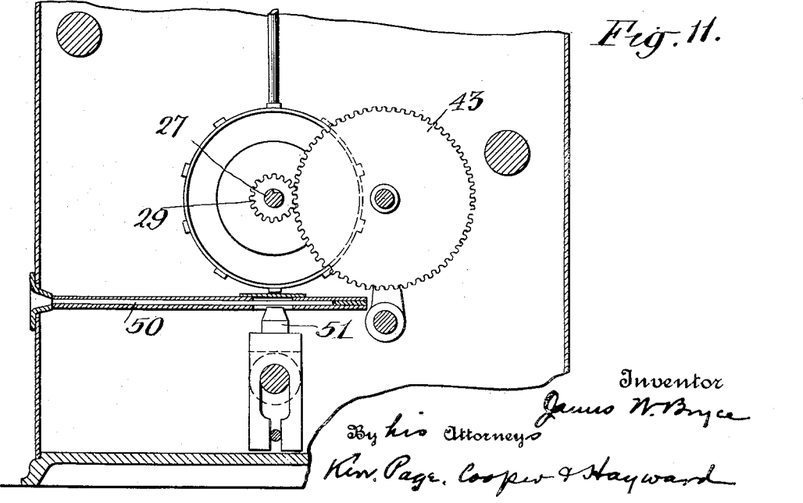
Fig. 11 is a sectional view of the impression mechanism of the recorder.

In Figs. 10 and 11 the means for taking a record from the figure disks is shown. This consists of a chute 50 which permits a card to be inserted under the two series of disks and any suitable impression mechanism 51 which forces the card up against those type which are at the moment in the printing position.

Figures 7, 8:
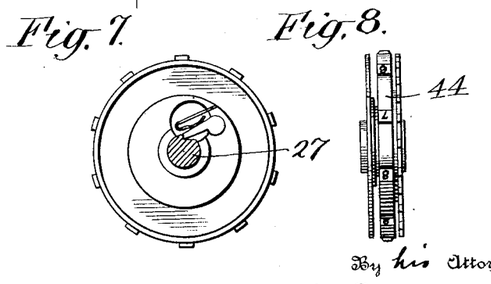
Fig. 7 is an enlarged face view of one of the counter wheels and the means associated therewith for resetting the wheels to the zero position.
Fig. 8 is a side view of the same.
Figure 12:
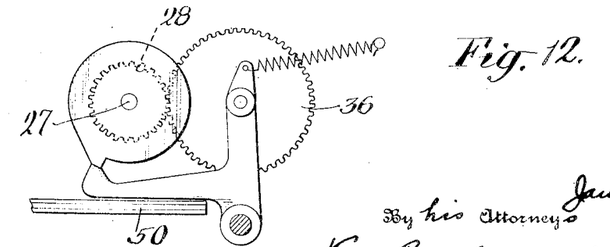
Fig. 12 is a detail of the resetting means.
Figure 13:
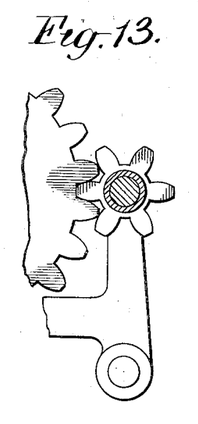
Figs. 13, 14 and 15 are details of the transfer devices for the type wheels.
Figure 14:
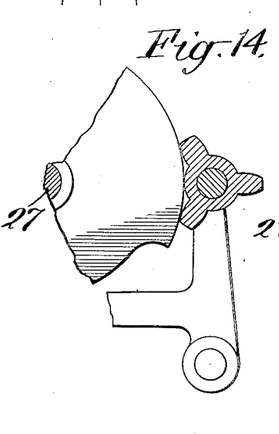
Figure 15:
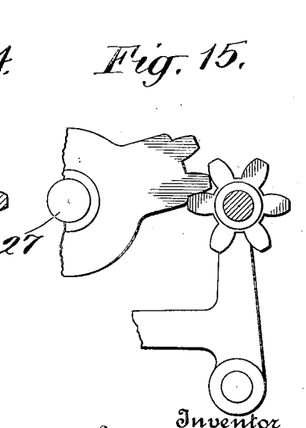
Figures 16, 18:
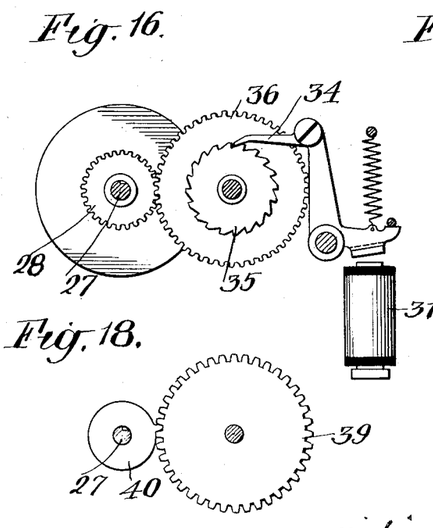
Fig. 16 is a detail of the means for operating the counter by electric impulses.
Fig. 18 is a detail of transfer gears.

Out of abundant precaution that a fully operative and practical form of device be disclosed in the present application to those skilled in the art who may wish to construct the same, I have supplemented a somewhat general description with drawings which go much more into details and will be readily understood. In addition to the parts hereinbefore described, these drawings show in Figs. 7, 8 and 12 a well known form of mechanism used for resetting the type wheels to zero whenever that is necessary, and in Figs. 13, 14 and 15 a well known form of transfer mechanism for use with the register wheels shown at the left in Figs. 9 and 10.

It will be apparent that the number of rates which can be handled by the apparatus described is not limited by the number of lines, since to increase the number of rates it is only necessary to add additional counter wheel units to the counter, additional actuators, and additional selective connectors. For example, the rates could be increased to $9.999 per hour by adding an additional magnet like 33 an additional wheel and transfer mechanism and a single selective connector in the form of a jack or plug 48. With such increase the number of plug holes 25 would preferably also be increased from three to four for each line or bar.

The apparatus which I have now described is so simple, and may be constructed for so small an amount that it may be used in great numbers in a manufacturing establishment without involving any burdensome expense. Theoretically, of course, one counter for each operative would be the ideal condition, and in case it be so used it may be started and stopped in operation by a workman's key in a manner well understood in this art.

It is manifest that the device may be operated by either direct or alternating currents, and that the system involves, under any circumstances, the minimum of wiring. Moreover, so far as the time element is concerned, this may be secured by a primary or a secondary clock or by an impulse system of known period.

Having now described my invention what I claim is:—

1. A computing apparatus comprising in combination a series of circuit closers, means for operating the same at a given time rate, each circuit closer, when so operated, having a different frequency or rate of closure which corresponds to the individual digit values from one to nine, a series of counter wheels, a plurality of electromagnets each of which corresponds to a certain digit position value for operating the individual wheels and electrical connectors adapted to connect any one of said magnets with any one of said circuit closers, said connection being made to the closers in accordance with the digit value and to the magnet in accordance with the digit position value.

2. A computing apparatus comprising in combination a series of cam disks each with a different number of high points corresponding to digits from one to nine, means for rotating said series of disks at a given time rate, a series of circuit closers each operated by the high points on a cam disk, a train of registering or counter disks, a plurality of electromagnets each magnet corresponding to a particular digit position value for operating the individual counter disks and means for connecting independently any one of said magnets with any one of said circuit closers.

3. A computing apparatus comprising in combination a plurality of circuit closers each adapted to send a fixed but different number of impulses in a given time corresponding to digit values, a train of registering or counter disks, a plurality of electromagnets each corresponding to a particular digit position value operating, when energized to advance one of said disks a predetermined amount, and connectors by means of which any one of said magnets may be connected in circuit with any one of said circuit closers, said connection being effected in accordance with the digit value of the closer and the position value of the magnet, whereby said magnets may receive a definite number of current impulses in a given time.

4. A computing apparatus comprising in combination a plurality of circuit closers each adapted to send a fixed but different number of impulses in a given time corresponding to digit values, a train of registering or counter disks representing units of different order, transfer or carrying means between the said disks, a plurality of electromagnets, each corresponding to a particular digit position value; means operated thereby when said magnets are energized, for advancing said counter disks a given amount independently of the transfer mechanism, and connectors for including any one of said magnets with any one of said circuit closers, said connection being effected in accordance with the value to be counted and in accordance with the digit value of the closer and the position value of the magnet.

5. A counter mechanism comprising in combination a train of registering disks with intermediate transfer mechanisms, the disks of the train representing units of different orders and the entire train making up a complete single counter unit, a plurality of disk propelling means, differential gears one side of which is in gear with the transfer mechanism of the disk of the next lower order of units, and the other side in gear with the disk propelling means, and the central gears of which impart movement to the disks whereby the said disks may be moved one by the other or independently.

6. A counter mechanism comprising in combination a train of registering disks with intermediate transfer mechanisms, the disks of the train representing units of different orders and the entire train making up a complete single counter unit, a plurality of electromagnets and pawls operated thereby when said magnets are energized, differential gears, one side of which is in gear with the disk of the next lower order of units, the other side in gear with a ratchet operated by a magnet pawl and a central gear engaging with and adapted to impart movement to a disk, whereby any or all of the disks may be moved one by the other or independently by the operation of the magnets.

7. A computing machine comprising in combination a series of cam disks mounted on the same shaft and each having a different number of high parts corresponding to digit values; means for rotating said disks at a given time rate, a series of circuit closers each operated by one of the cam disks, a train of registering or counter wheels, a plurality of electromagnets each adapted to operate one of said counter wheels and each corresponding to a particular digit position value; and connectors by which any one of said magnets may be included in the circuit, said connection being effected in accordance with the value to be counted and in accordance with the respective digit values of the cam disks and the position values of the magnets.

8. A computing apparatus comprising in combination with a clock mechanism, a series of cam disks rotated by the same at a given time rate, a series of circuit closes operated with different frequencies corresponding to digit values by the cam disks, a train of counter wheels, a plurality of magnets each corresponding to a particular digit position value for operating the individual wheels and connectors adapted to include any one of said magnets in the circuit of any one of said circuit closers, said connection being effected in accordance with the value to be counted and in accordance with the respective digit values of the cam disks and the position values of the magnets.

9. In a computing apparatus, in combination, a plurality of electric circuits, means for energizing said circuits individually in accordance with the digit value of the particular circuit but irrespective of the position value of a particular digit in the complete value, counting mechanism and actuating mechanism therefor, said mechanism comprising a number of units each of which corresponds to a particular position value of a digit in the complete value, and selective connectors adapted to selectively connect the said mechanism with the circuits in accordance with the position value of the mechanism and in accordance with the digit value of the circuits.

10. The invention set forth in claim 9, in which the means for energizing the circuits is driven at a particular time rate.

11. The invention set forth in claim 9, in which a transfer mechanism is provided to transfer quantities from the lower to higher order units of the counting mechanism.

12. The invention set forth in claim 9, in which a transfer mechanism is provided to transfer quantities from the lower to higher order units of the counting mechanism, said transfer mechanism having provisions for effecting the said transfer irrespective of the simultaneous movement of the lower and higher order units.

13. The invention set forth in claim 9, in which means is provided for taking a record of the count upon the counting mechanism.

14. In a computing apparatus, in combination, a plurality of electric circuits, means for energizing said circuits in accordance with the digit value of a particular circuit but irrespective of the position value of a particular digit in the complete value, a plurality of counting mechanisms adapted to count numbers corresponding to desired data, a plurality of actuating mechanisms therefor, each counting mechanism and its actuating mechanism being composed of a number of units each of which corresponds to a particular position value of a digit in the complete value counted, and a plurality of selective connectors adapted to selectively connect the said mechanisms with the circuits in accordance with the position value of mechanisms and in accordance with the digit value of the circuits.

15. The invention set forth in claim 14 in which a plurality of groups of selective connectors are employed whereby one or more counters may be employed.

16. The invention set forth in claim 14, in which means is provided for taking a record of the counts upon the counter mechanism.

17. In a computing apparatus comprising in combination, a value impulse timer, means for operating the same at a given time rate, a series of lines leading from said timer, said timer having provisions for transmitting to the individual lines impulses corresponding to the digit values of the complete value, irrespectively of the position value of said digits, a series of counter wheels and a plurality of individual magnets for operating the individual wheels of the counter, and electrical connectors adapted to selectively connect any one of said magnets with any one of the said lines.

18. In a computing apparatus, comprising in combination, a value impulse timer, means for driving the same at a given rate, a series of lines leading from said timer, each line corresponding to a particular digit value from one to nine, said timer having means for transmitting to each line a series of current impulses which correspond to the digit value transmitted by the particular line but which in number do not correspond to the position value of the digits, and means for selectively connecting said lines to an electrically actuated counter, said connections being effected in accordance with the digit values of the lines and said counter having provisions for receiving the impulses from the connectors in accordance with the position value of the digits making up the complete value counted.

In testimony whereof I affix my signature.

JAMES W. BRYCE.